United States Patent [19]

Sekido et al.

[11] Patent Number: 4,731,352

[45] Date of Patent: Mar. 15, 1988

[54] PROCESS FOR PRODUCING SUPPORTS FOR CATALYSTS

[75] Inventors: Yasuo Sekido; Shinji Takase; Akira Inoue, all of Yokohama, Japan

[73] Assignee: Nippon Oil Co., Ltd., Tokyo, Japan

[21] Appl. No.: 908,690

[22] Filed: Sep. 18, 1986

[30] Foreign Application Priority Data

Sep. 19, 1985 [JP] Japan .................... 60/207336

[51] Int. Cl.$^4$ ............................ B01J 20/02
[52] U.S. Cl. ................................. 502/439
[58] Field of Search ........................ 502/439

[56] References Cited

U.S. PATENT DOCUMENTS 4,444,899  4/1984  Yamada et al. ............... 502/439
4,508,849  4/1985  Inoue et al. .................. 502/439

FOREIGN PATENT DOCUMENTS 2511967  10/1975  Fed. Rep. of Germany ...... 502/439
52-104498  9/1977  Japan .
55-27830  2/1980  Japan .
56-35893  8/1981  Japan .
57-201532  12/1982  Japan .
59-23859  6/1984  Japan .

OTHER PUBLICATIONS

D. Basmadjlan et al., Journal of Catalysis, 1, 547, (1962).

*Primary Examiner*—Carl F. Dees
*Attorney, Agent, or Firm*—Finnegan, Henderson, Farabow, Garrett & Dunner

[57] ABSTRACT

A process is disclosed for producing supports suitable for catalysts. Selected inorganic oxide precursors combined with specified amounts of selected olefin-maleic anhydride copolymer salts are blended, molded, dried and calcined whereby strength and specific surface area are greatly improved. Such supports have a specified pore size distribution.

8 Claims, 4 Drawing Figures

PROCESS FOR PRODUCING SUPPORTS FOR CATALYSTS

BACKGROUND OF THE INVENTION

1. Field of the Invention

This invention relates to a process for the production of supports suitable for catalysts to be used in various fields of chemical industry.

2. Prior Art

As concerns solid catalysts particularly for use in the hydrogenation of hydrocarbon residual oils, there have been made reports on the relationship between the specific surface area, the amount of active metals and the catalytic activity and between the pore size and the service life. Numerous methods have been proposed to this end to prolong the catalyst life by controlling or regulating its pore size. One such method involves increasing the size of the primary particles in an alumina gel as disclosed for instance in Japanese Patent Publication No. 56-35893. However, with this method it is difficult to provide a catalyst having a pore radius in a range 100 Å-1,000 Å which is required for effective hydrogenation of residual oils. A similar method is disclosed in Japanese Patent Laid-Open Publication No. 55-27830 whereby the size of gelled alumina particles can be controlled at will; however, the catalyst support is too much reduced in strength and specific gravity to warrant commercial application.

According to J. Catalysis, 1, 547 (1962), an alumina hydrogel is combined with a water-soluble polymer such as polyethylene glycol or the like to thereby form a catalyst predominantly of pore radii exceeding 1,000 Å and hence with reduced packing density.

In Japanese Patent Laid-Open Publication No. 52-104498 it is proposed to allow an alumina hydrogel to absorb polyethylene glycol, followed by extrusion molding and washing with alcohol. Japanese Patent Laid-Open Publication No. 57-201532 discloses introducing carbon black in particulate alumina. Japanese Patent Publication No. 59-23859 is directed to the use of a refractory inorganic oxide in combination with a peptizer and a surfactant. These methods, though capable of giving a pore radius range of 100 Å-500 Å, fail to selectively control the pore size within that range, if possible, only to limited extent.

The foregoing prior art methods would lead, given greater pore sizes, to catalysts of insufficient strength, reduced specific surface area and low packing density, the latter two parameters being literally undesirable for catalytic reactions involving hydrogenated desulfurization, denitrification, demetalation and thermal decomposition.

It has been found that crude oils imported nowadays are rather heavy, widely variable in grade and irregular in polymeric materials containing vanadium or nickel. This has created an urgent need for improved catalysts which are capable of treating such oil fractions.

SUMMARY OF THE INVENTION

Surprisingly, it has now been found that catalyst supports blessed with optimum pore size characteristics and excellent physical properties can be obtained by the use of particulate, refractory inorganic oxide precursors combined with olefin-maleic anhydride copolymer salts and, where desired, with surfactants.

The supports according to the invention may be effectively applied to catalysts for use particularly in the treatment of hydrocarbon residual oils.

It is the primary object of the invention to provide an improved process for the production of catalyst supports which are capable of exhibiting not only optimum pore size distribution but also sufficient mechanical strength and greater specific surface area, providing prolonged service life of the catalyst.

According to the invention, a process is provided for producing a support for use with catalysts. The process comprises (a) combining a refractory inorganic oxide precursor with a salt of an olefin-maleic anhydride copolymer, (b) stirring the mixture with heat, (c) molding the same, and (d) drying and calcining the molded product.

PREFERRED EMBODIMENTS OF THE INVENTION

Figure 1:
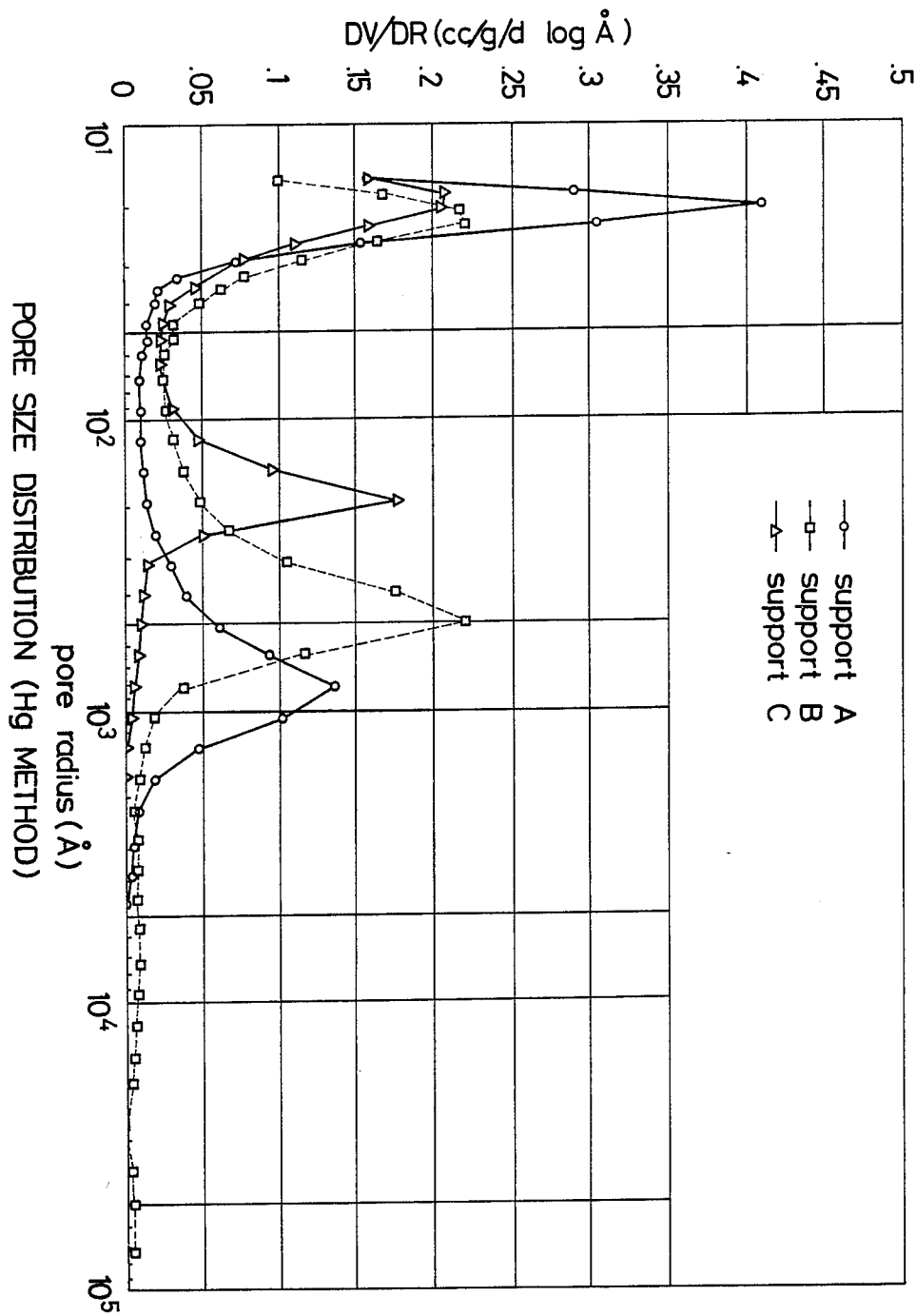
FIGS. 1 and 2 are graphic representations of the pore size distributions of supports obtained by the process of the invention.

Refractory inorganic oxide precursors eligible for the purpose of the invention are salts in the form of solution, sol and gel and also in the particulate form of inorganic metals of Groups II, III, IV and V of the Periodic Table. Specific examples of the metals include metals such as alumina, silica, titania, boria, zirconia and the like, and composite metals such as silica-alumina, silica-magnesia, alumina-magnesia, alumina-titania, silica-titania, alumina-boria, alumina-zirconia, silica-zirconia, alumina-phospha and the like.

By the solution referred to above is meant, for instance in the case of alumina, an aqueous solution containing alumina and a starting material used to convert it to alumina hydroxide, or an aqueous solution having alumina hydroxide diluted. The sols and gels referred to above are amorphous alumina hydrates which can be conventionally obtained for instance by hydrolysis of alumina with aluminum salts such as aluminum sulfide, aluminum nitrate and the like, or with alkaline salts of aluminic acid such as sodium aluminate and the like and aluminum salts thereof.

The particulate precursors may be obtained as by spray drying of the above salts in solution, sol and gel forms.

Eligible salts of olefin-maleic anhydride copolymers are monovalent and divalent salts in an aqueous form of and polyvalent salts in a gel form of ammonium, sodium, magnesium, zinc and the like. Suitable olefins may have one or more carbon-carbon double bonds attached and a carbon number of 2-20, preferably 2-10. Specific examples of the olefins include monoolefins such as ethylene, propylene, n-butene, iso-butene, pentene, hexene, heptene, octene, decene, styrene and the like, and diolefins such as butadiene, isoprene, octadiene and the like. The olefins may be used alone or in combination.

Maleic anhydride to be used in the invention may contain a derivative thereof or an alpha- or beta-unsaturated dicarboxylic acid in an amount not exceeding 10% by weight.

The olefin-maleic anhydride copolymers can be formed for instance by usual radical polymerization at 40°-150° C. with use of an initiator such as an organic peroxide. The copolymers should preferably have an average molecular weight between 1,000 and 20,000.

The amount of the copolymer derived salt to be added should be greater than 1%, preferably 1-50%, more preferably 3-20%, based on the weight of the particulate precursor. Smaller amounts would lead to excess strength, resulting in uncontrolled pore size distribution.

In the practice of the process according to the invention, a selected precursor is incorporated with a selected copolymer salt and blended as by a kneader at 25°-90° C., preferably 40°-60° C., for 0.5-4 hours. The blend is molded on an extruder and under usual conditions to a diameter of 0.5-10 mm, preferably 0.8-1.5 mm. The extrudate may be cylindrical, spherical or pelleted in shape. It is thereafter dried at 100°-250° C., preferably 100°-150° C. for 1-10 hours, followed by calcination in an air-circulating oven at 450°-600° C., preferably 500°-550° C. for 1-10 hours, preferably 1-3 hours, thereby obtaining a desired support.

Importantly, the supports produced in accordance with the invention should have a strength of more than 0.9 kg/piece, a specific surface area of 150-500 m$^2$/g and a pore volume of 40% or greater in a pore radius portion of 100 Å-1,000 Å. More specifically, the supports should have a pore size distribution in which one peak is present at an optional site of a 100 Å-1,000 Å portion and a pore volume in that portion is at least 40% of the total pore volume.

Where it is found preferable, surfactants may be employed to prevent the copolymer salt against liberation from the blend and otherwise provide improved moldability of the blend. The surfactants may be suitably selected from ionic surfactants such as cations and anions as well as from nonionic surfactants. However, those surfactants should be avoided which tend to leave a toxic effect on the resulting catalyst or to generate objectionable gas while in calcination of the support.

Specific examples of the surfactants include nonionic surfactants such as polyoxyethylene alkyl ether, straight polyoxyalkyl ether, polyoxyethylene sec-alcohol ether, polyoxyethylene alkyl phenyl ether, polyoxyethylene glycerine fatty acid ester, polyoxyethylene sorbitan fatty acid ester and the like.

The amount of the surfactant to be added should be in the range of 0.1-10% based on the weight of the precursor.

The invention will be further described with reference to the following examples in which all percentages are by weight and all surfactants are commercially available polyoxyethylene alkyl phenyl ether ("Nonipol 130", Sanyo Chemical Industries Ltd.).

EXAMPLE 1

Aqueous sodium aluminate solution (1.932 kg) containing Na$_2$O (11.3%) and Al$_2$O$_3$ (22%) was added to deionized water (798 liters) which was then heated at 60° C. The mixture was neutralized with stirring to pH 7.2 by addition of aqueous 8.4% aluminum sulfide solution that eventually amounted to 3.6 kg. After being disposed still for one hour the resulting solution was put into a filter in which it was washed by sprinkling 0.2% ammonia water, giving a filter cake (1.215 kg) from which most of Na$_2$O and SO$_4$ had been removed. An alumina gelled slurry was prepared by adding equivalent deionized water to the cake and subsequently spray-dried thereby obtaining a particulate alumina precursor.

EXAMPLE 2

To the precursor prepared in Example 1 was added aqueous solution (equivalent) in which butadiene-maleic anhydride copolymer ammonium salt (4.4%) and Nonipol 130 (0.9%) were dissolved. The mixture was kneaded on a batch type kneader at 60° C. for about 3 hours and extrusion-molded to a diameter of 1 mm. The extrudate was dried at 120° C. for 5 hours, followed by calcination at 550° C. for one hour in an air-circulating oven with a temperature rise of 200° C./hour thereby obtaining a support (A).

EXAMPLE 3

The procedure of Example 2 was followed except that the amounts of ammonium salt (8.0%) and surfactant (1.4%) were changed to give a support (B).

EXAMPLE 4

The procedure of Example 2 was followed except that the amounts of ammonium salt (14.0%) and surfactant (2.4%) were changed to give a support (C).

The physical properties and pore size distributions of supports A, B and C (Examples 2, 3 and 4) are shown in Table 1 and FIG. 1.

EXAMPLE 5

To the precursor prepared in Example 1 was added aqueous solution (equivalent) in which 1-hexene-maleic anhydride copolymer ammonium salt (22.1%) and surfactant (1.8%). The mixture was treated in a manner similar to Example 2 to give a support (G).

EXAMPLE 6

To the precursor prepared in Example 1 was added aqueous solution (equivalent) in which butadiene-maleic anhydride copolymer magnesium salt (half ion-exchanged) (18.6%) and surfactant (1.8%) were dissolved. The mixture was treated in a manner similar to Example 2 to give a support (H).

Figure 2:
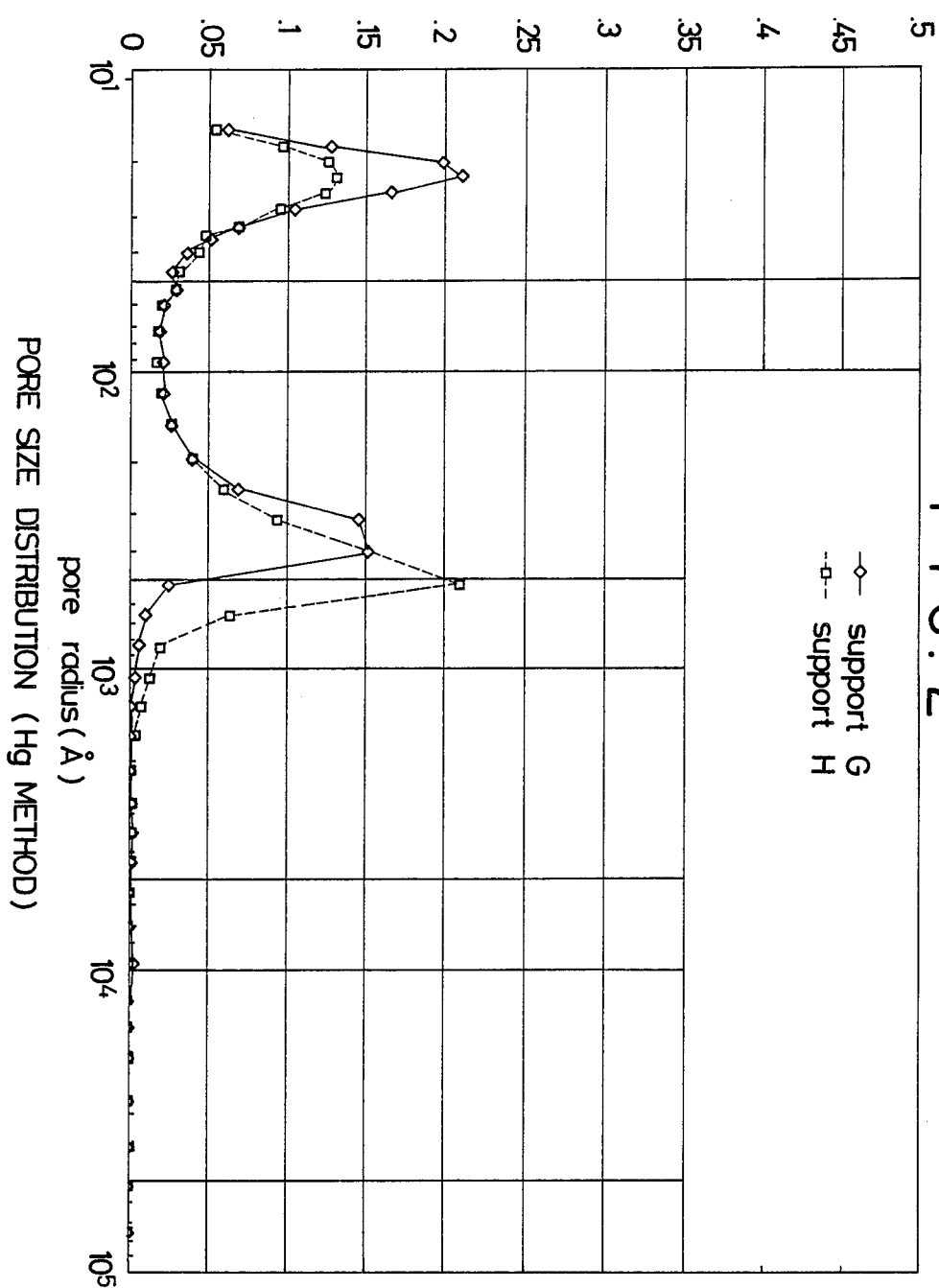

The physical properties and pore size distributions of supports G and H (Examples 5 and 6) are shown in Table 1 and FIG. 2.

COMPARATIVE EXAMPLE 1

To the precursor prepared in Example 1 was added equivalent deionized water. The mixture was blended on a batch type kneader for about one hour and extruded to a diameter of 1 mm. The extrudate was treated in a manner similar to Example 2 to give a support (D).

COMPARATIVE EXAMPLE 2

The procedure of Comparative Example 1 was followed except that surfactant (5.5%) was dissolved in deionized water to give a support (E).

COMPARATIVE EXAMPLE 3

The procedure of Comparative Example 1 was followed except that surfactant (11%) was dissolved in deionized water to give a support (F).

Figure 3:
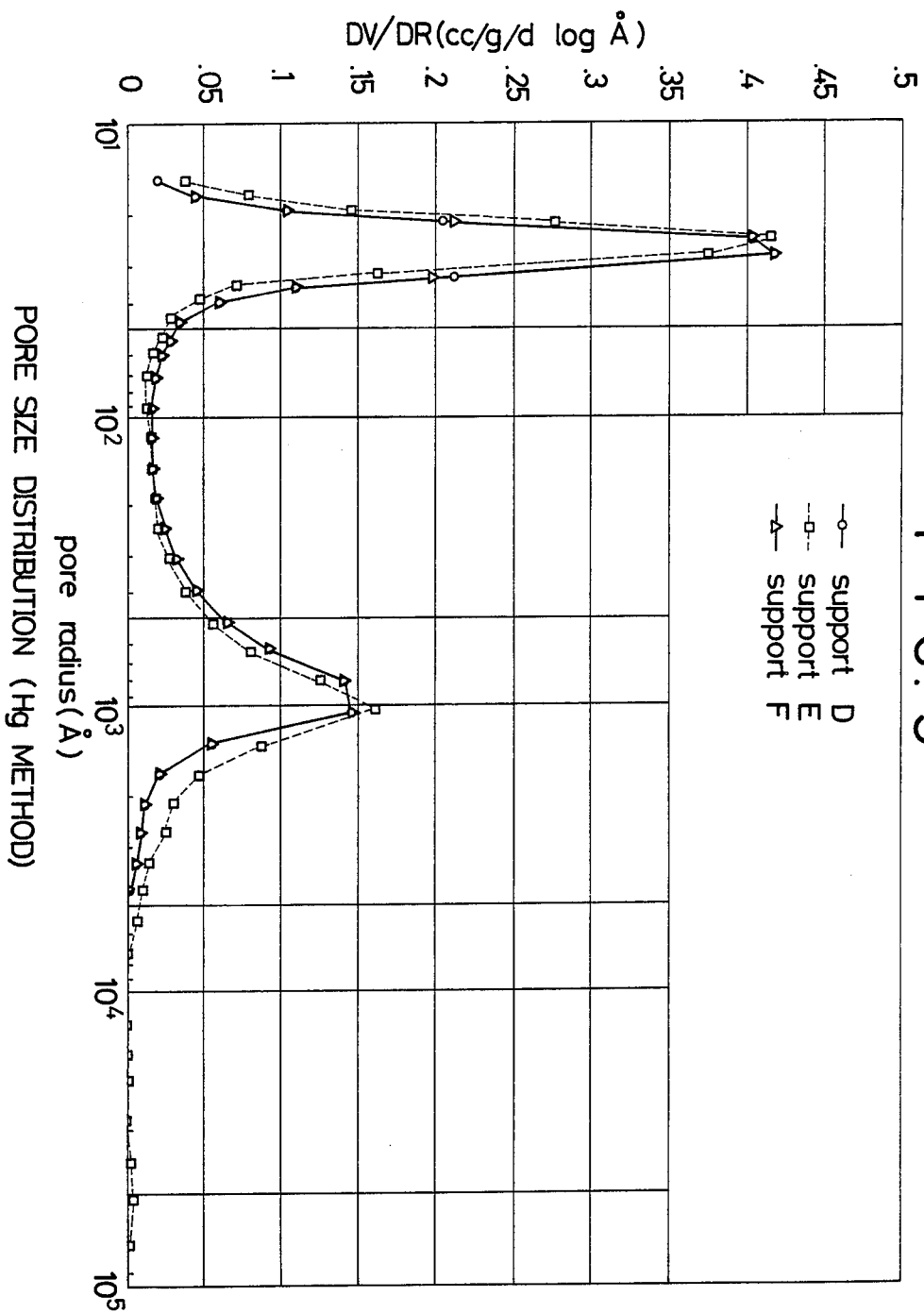
FIG. 3 is a view similar to FIGS. 1 and 2, but showing the pore size distributions of supports prepared for comparative purposes.

The physical properties and pore size distributions of supports D, E and F (Comparative Examples 1, 2 and 3) are shown in Table 1 and FIG. 3.

EXAMPLE 7 stead of butadiene (support G) and also by the use of magnesium salt instead of ammonium salt (support H).

Figure 4:
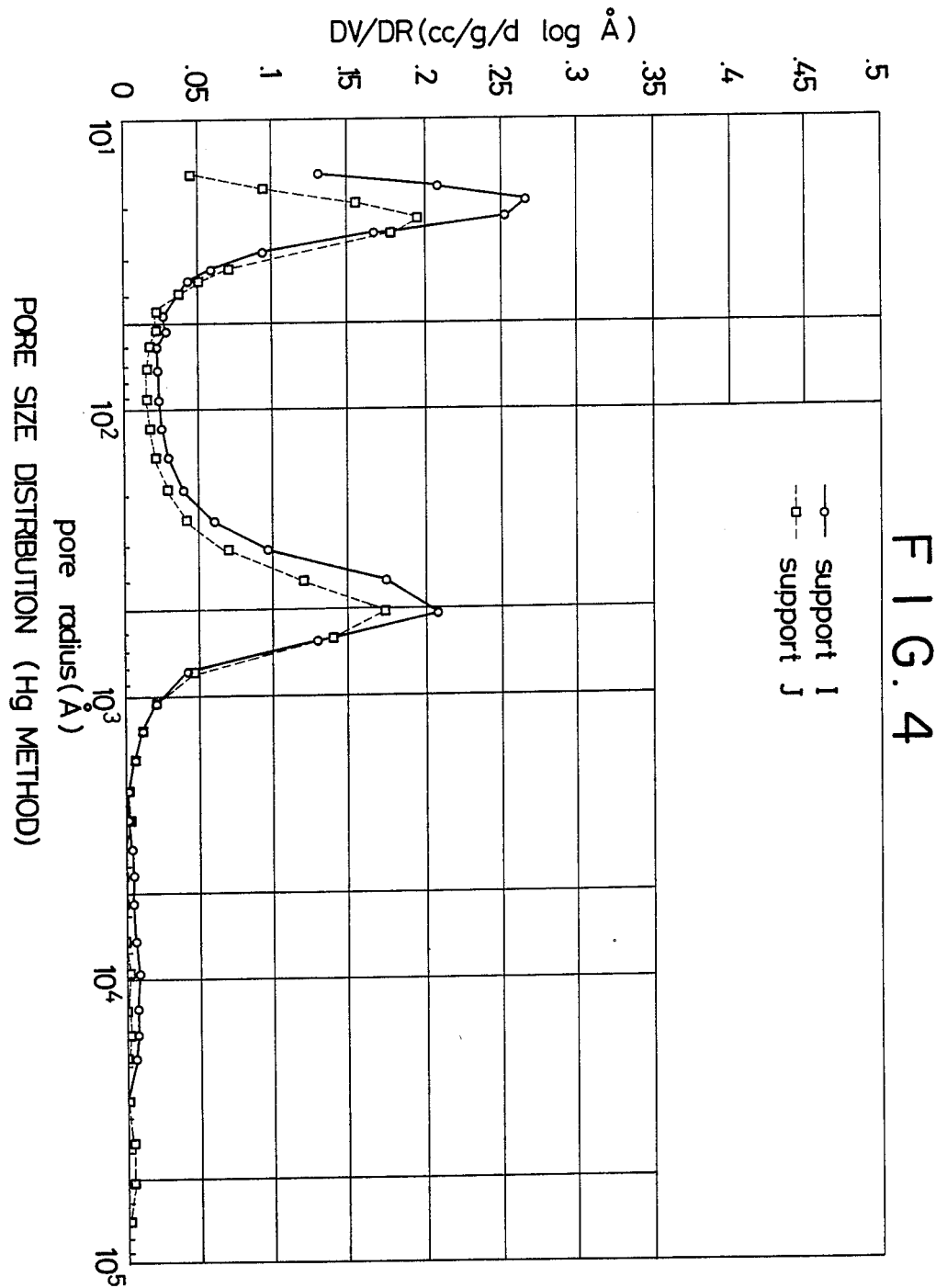
FIG. 4 is a view similar to FIGS. 1 and 2, but showing the pore size distributions of a support produced in accordance with the invention and a catalyst resulting from carrying active metals thereon by a certain method.

Support I of the invention has been found highly capable of supporting active metals as apparent from the results given in Table 2 and FIG. 4.

TABLE 1

| examples/supports | physical properties | | | | | |
|---|---|---|---|---|---|---|
| | strength (kg/piece) | specific surface area (mμ/g) | pore volume (cc/g) | | | |
| | | | 15 Å–150 μm | 15 Å–100 Å | 100 Å–1,000 Å | 1,000 Å–150 μm |
| Examples | | | | | | |
| 2/A | 1.2 | 347 | 0.784 | 0.430 | 0.338 (43.1) | 0.016 |
| 3/B | 1.7 | 332 | 0.940 | 0.373 | 0.527 (56.1) | 0.040 |
| 4/C | 4.0 | 396 | 0.587 | 0.324 | 0.249 (42.4) | 0.014 |
| 5/G | 3.3 | 349 | 0.646 | 0.332 | 0.292 (45.2) | 0.022 |
| 6/H | 1.6 | 375 | 0.883 | 0.327 | 0.504 (57.1) | 0.052 |
| Comparative Examples | | | | | | |
| 1/D | 0.5 | 274 | 0.869 | 0.463 | 0.389 (44.8) | 0.017 |
| 2/E | 0.5 | 335 | 0.935 | 0.478 | 0.433 (46.3) | 0.024 |
| 3/F | 0.5 | 311 | 0.880 | 0.469 | 0.394 (44.8) | 0.017 | parentheses: pore volume of 100 Å–1,000 Å/total pore volume × 100

TABLE 2

| examples/ samples | physical properties | | | | | | | active metals | |
|---|---|---|---|---|---|---|---|---|---|
| | strength (kg/piece) | specific surface area (mμ/g) | packing density (g/cc) | pore volume (cc/g) | | | | MoO₃ (wt. %) | CoO (wt. %) |
| | | | | 15 Å–150 μm | 15 Å–100 Å | 100 Å–1,000 Å | 1,000 Å–150 μm | | |
| Example 7/I (support) | 2.1 | 321 | — | 0.928 | 0.390 | 0.497 (53.6) | 0.041 | — | — |
| Example 8/J (catalyst) | 1.7 | 301 | 0.66 | 0.731 | 0.289 | 0.413 (56.5) | 0.029 | 15.3 | 4.8 | parentheses: pore volume of 100 Å–1,000 Å/total pore volume × 100

The procedure of Example 2 was followed except that the amounts of ammonium salt (8.2%) and surfactant (1.5%) were changed to give a support (I).

EXAMPLE 8

Support I prepared in Example 7 was impregnated with MoO$_3$ and CoO by a known method (e.g. Japanese Patent Publication No. 59-69147). The impregnate was dried at 120° C. for 5 hours and thereafter calcined at 550° C. for one hour in an air-circulating oven with a temperature rise of 200° C./hour, whereupon there was obtained a supported catalyst (J).

The physical properties and pore size distributions of support I and catalyst J are shown in Table 2 and FIG. 4.

It is to be noted as appears clear from Table 1 that supports A, B, C, G and H embodying the invention are highly satisfactory in respect of strength, compared to controls D, E and F. Supports B and H also revealed pore volume increase in a 100 Å–1,000 Å portion.

As evidenced by supports A, B and C in FIG. 1, the peak in the 100 Å–1,000 Å portion shifts farther to the reduced pore radii the greater the amount of the butadiene-maleic anhydride copolymer salt. Increased amounts of the surfactant were ineffective in pore size adjustment as exhibited by controls D, E and F in FIG. 3.

FIG. 2 clearly demonstrates that desired pore size distributions are attainable by the use of 1-hexene in-

What is claimed is:

1. A process for producing a support for use with catalysts which comprises:
    (a) combining a refractory inorganic oxide precursor with a salt of an olefin-maleic anhydride copolymer;
    (b) stirring the mixture with heat;
    (c) molding the same; and
    (d) drying and calcining the molded product.

2. A process according to claim 1 wherein said salt is added in an amount greater than 1 percent based on the weight of said precursor.

3. A process according to claim 1 wherein said support has a pore size distribution in which one peak is present at an optional site in a 100 Å–1,000 Å portion and a pore volume in said portion is at least 40 percent of the total pore volume.

4. A process according to claim 1 wherein said precursor is a salt in the form of solution, sol, gel or powder of alumina, silica, titania, boria, zirconia, silica-alumina, silica-magnesia, alumina-magnesia, alumina-titania, silica-titania, alumina-boria, alumina-zirconia, silica-zirconia or alumina-phospha.

5. A process according to claim 1 wherein said copolymer is a copolymer of maleic anhydride with ethylene, propylene, n-butene, iso-butene, pentene, hexene, octene, decene, styrene, butadiene, isoprene or octadiene or combinations thereof.

6. A process according to claim 1 or 2 wherein said salt is in the form of ammonium, sodium, magnesium or zinc.

7. A process according to claim 1 further including the addition of a surfactant in an amount of 0.1 to 10 percent based on the weight of said precursor.

8. A process according to claim 7 wherein said surfactant is polyoxyethylene alkyl ether, straight polyoxyalkyl ether, polyoxyethylene sec-alcohol ether, polyoxyethylene alkyl phenyl ether, polyoxyethylene glycerine fatty acid ester or polyoxyethylene sorbitan fatty acid ester.

* * * * *